(12) United States Patent
Pueschner et al.

(10) Patent No.: US 10,380,477 B2
(45) Date of Patent: Aug. 13, 2019

(54) CHIP CARD AND METHOD OF FORMING A CHIP CARD

(71) Applicant: Infineon Technologies AG, Neubiberg (DE)

(72) Inventors: Frank Pueschner, Kelheim (DE); Peter Stampka, Burglengenfeld (DE); Siegfried Hoffner, Nesselwang (DE); Jens Pohl, Bernhardswald (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/406,832

(22) Filed: Jan. 16, 2017

(65) Prior Publication Data

US 2017/0206448 A1    Jul. 20, 2017

(30) Foreign Application Priority Data

Jan. 20, 2016   (DE) .................. 10 2016 100 898

(51) Int. Cl.
*G06K 19/00*  (2006.01)
*G06K 19/077*  (2006.01)

(52) U.S. Cl.
CPC ... *G06K 19/07775* (2013.01); *G06K 19/0776* (2013.01); *G06K 19/07779* (2013.01); *G06K 19/07794* (2013.01)

(58) Field of Classification Search
USPC .......... 235/435, 439, 451, 487, 492; 340/10, 340/572
See application file for complete search history.

(56) References Cited

U.S. PATENT DOCUMENTS

| 2001/0011413 A1 | 8/2001 | Yamaguchi et al. |
| 2002/0100810 A1* | 8/2002 | Amadeo .......... G06K 19/07718 235/492 |

(Continued)

FOREIGN PATENT DOCUMENTS

| CN | 1304634 A | 7/2001 |
| CN | 101194395 A | 6/2008 |

(Continued)

OTHER PUBLICATIONS

Wikipedia, "Elektrische Kapazität", retrieved from the Internet <URL:https://de.wikipedia.org/wiki/Elektrische_Kapazit%C3%A4t>, retrieved on Aug. 25, 2015.

(Continued)

*Primary Examiner* — Matthew Mikels
(74) *Attorney, Agent, or Firm* — Viering, Jentschura & Partner MBB

(57) ABSTRACT

A chip card is provided. The chip card may include a chip card substrate and an antenna structure disposed in or over the chip card substrate, the antenna structure including a wire arranged to form a first antenna portion configured to contactlessly couple to a chip card external device and a second antenna portion configured to couple to a chip antenna, wherein the wire may include an electrically conductive material coated with an electrically insulating material, wherein the wire of the first antenna portion may be arranged such that a direction of laying progress of the wire of at least some adjacent wire portions are opposite to each other, such that the at least some adjacent wire portions may form a capacitor, wherein the isolation material of the at least some adjacent wire portions may be physically contacting each other.

9 Claims, 9 Drawing Sheets

(56) References Cited

U.S. PATENT DOCUMENTS

| | | | |
|---|---|---|---|
| 2011/0084146 A1* | 4/2011 | Owada | G06K 19/07784 |
| | | | 235/492 |
| 2012/0025986 A1* | 2/2012 | Hino | H01Q 1/2225 |
| | | | 340/572.1 |
| 2013/0146671 A1 | 6/2013 | Grieshofer et al. | |
| 2014/0028528 A1* | 1/2014 | Tanabe | H01Q 9/27 |
| | | | 343/895 |

FOREIGN PATENT DOCUMENTS

| | | |
|---|---|---|
| CN | 103165971 A | 6/2013 |
| CN | 103907125 A | 7/2014 |
| WO | 2013020610 A | 2/2013 |

OTHER PUBLICATIONS

Elektrisola, "Weltgrößter Hersteller für dünnen Kupferlackdraht 0.010-0.50 mm (AWG 24-58)", retrieved from the Internet <URL: http://www.elektrisola.com/de/home.html>, retrieved on Aug. 25, 2015.

Chinese Office Action for corresponding patent application 2017100167836 dated May 28, 2019, 9 pages and 7 pages translation (for information purpose only.

* cited by examiner

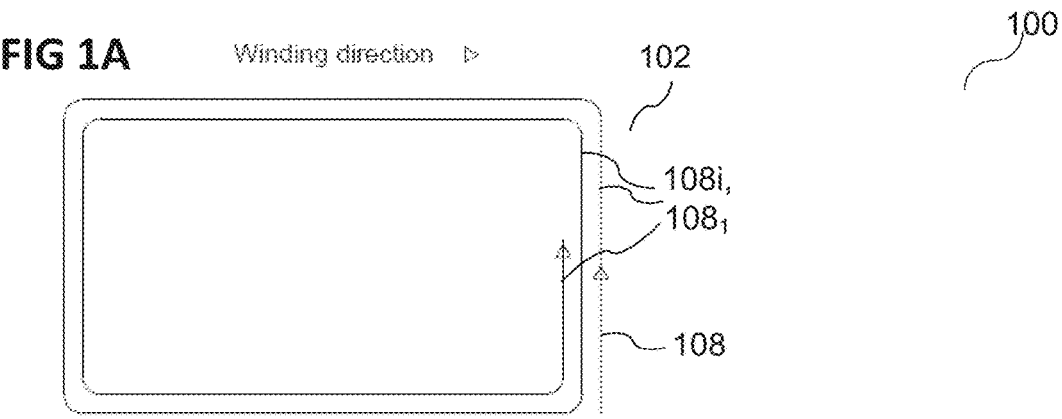
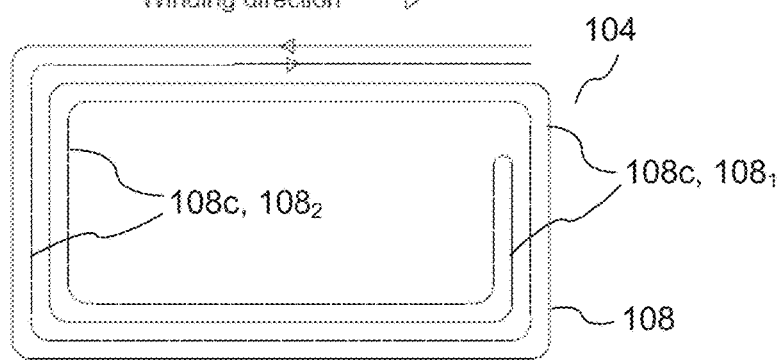
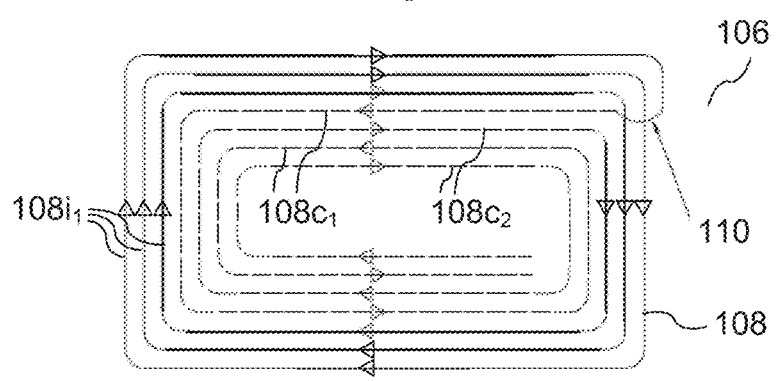

FIG 3
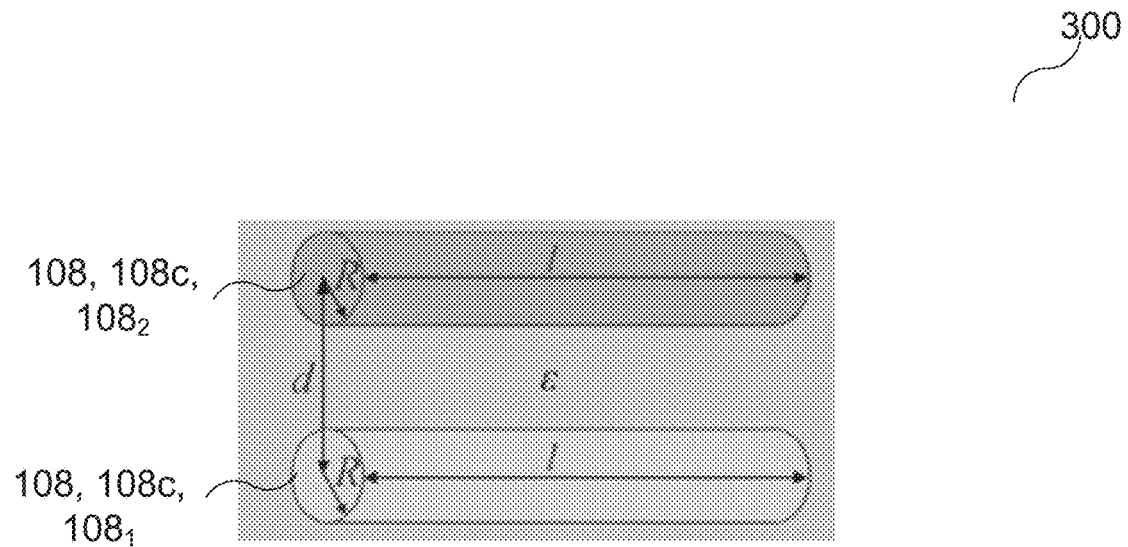
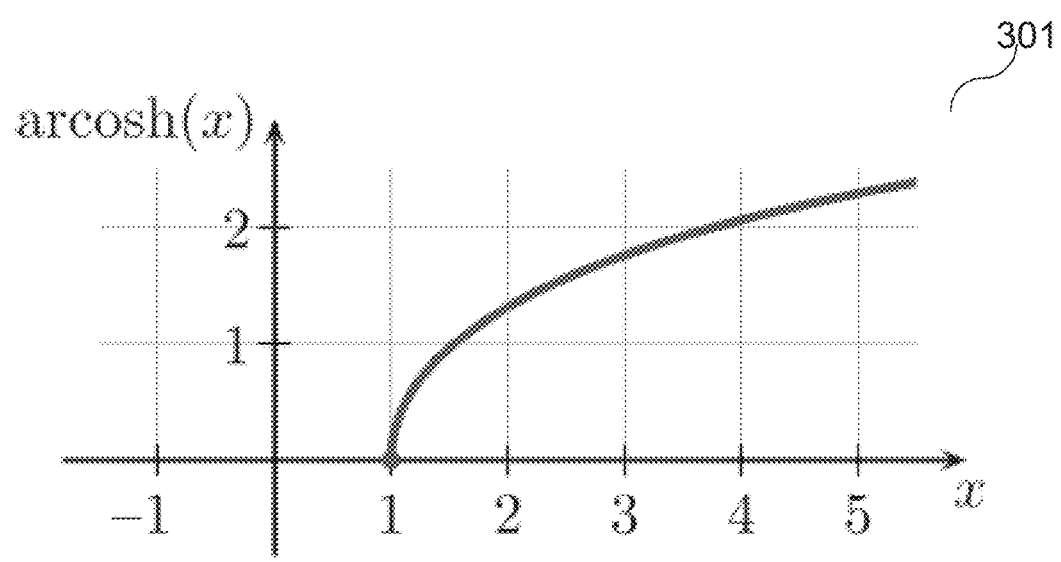

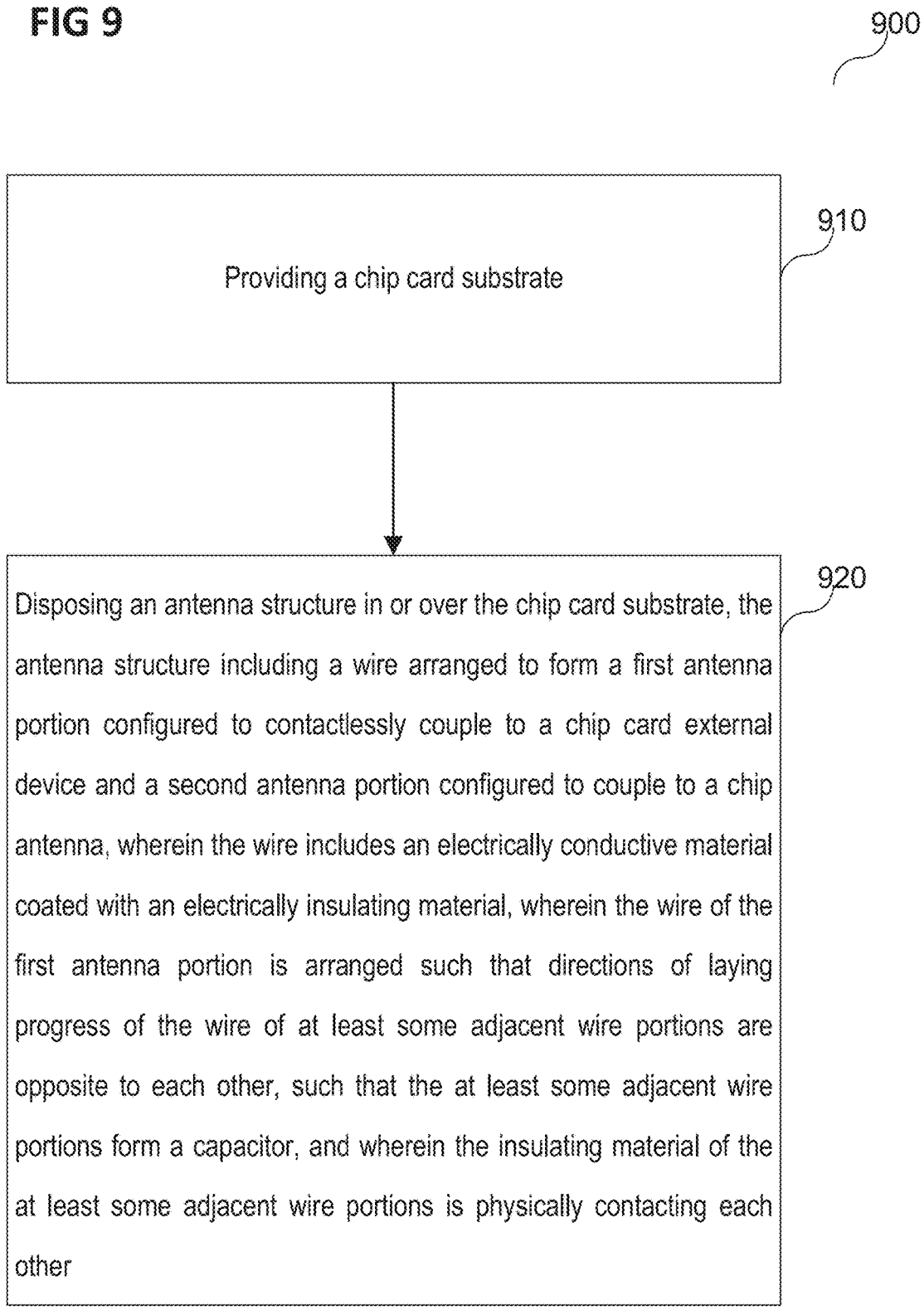

CHIP CARD AND METHOD OF FORMING A CHIP CARD

CROSS-REFERENCE TO RELATED APPLICATION

This application claims priority to German Patent Application Serial No. 10 2016 100 898.2, which was filed Jan. 20, 2016, and is incorporated herein by reference in its entirety.

TECHNICAL FIELD

Various embodiments relate generally to a chip card and to a method of forming a chip card.

BACKGROUND

In a contactless chip card, also referred to as a Smart Card, or in a so-called dual interface chip card, a communication between a chip and a card reader may be established contactlessly (in a case of the dual interface chip card in addition to an exposed chip contact that is configured to be physically contacted by the card reader). An interface for the contactless communication may include a chip antenna, which may be disposed on or in the chip card and may be in contact with the chip. The chip antenna and the chip may both be disposed on a chip card module. Such a combined arrangement of the antenna, which may be formed as a coil, and the chip on the chip card module may be referred to as coil-on-module (CoM).

For improving a performance of the contactless interface, in particular for increasing a distance up to which a contactless communication between the chip and the chip card reader may be possible, an amplifier antenna, also referred to as booster antenna, may be disposed on or in the chip card. The booster antenna may include a wire that may be arranged as a coil. The booster antenna may be inductively coupled to the chip antenna and thereby to the chip (or, more generally, to a semiconductor device). There may not be a galvanic interconnect between the module and the booster antenna.

Such Smart Cards may for example be used for transportation, banking, and government ID applications, and may typically work at an operating frequency of 13.56 MHz.

The wire booster antenna for such a Smart Card may typically be formed by embedding the wire in a sheet of plastic material (e.g. PVC, PC, PET-G), which may also be referred to as a chip card substrate, thereby forming an antenna sheet. The antenna sheet may be laminated with additional plastic sheets to a final thickness of the Smart Card (typically 0.80 mm).

The Smart Card, e.g. a resonance frequency of the boost antenna, may be tuned to a desired value. The resonance frequency may depend on various properties of the antenna, e.g. on a resistance, a capacitance, and an inductance. Thus, these properties may be set to defined values. These properties can be influenced by a geometry, which may include an arrangement, of the wire antenna.

As shown in FIG. 1A, structures with mainly inductive properties may be created by embedding wires $108$, $108i$, $108_1$ in parallel coil lines with similar orientation. "Similar orientation" may be understood to mean that, for the process of laying the parallel coil lines, a direction of laying progress, also referred to as winding direction, is the same for the parallel coil lines with the mainly inductive properties. Another way to describe this property may be a helicity, which may be the same for the parallel coil lines with the mainly inductive properties. An additional indication of "i" in the reference $108i$ for the wire $108$ refers to the mainly inductive property of a specified portion of the wire (in FIG. 1A the complete wire, because all of it may have mainly inductive properties), and an additional index of "1" in the reference $108_1$ for the wire $108$ refers to the direction of laying progress (the orientation) of a specified portion of the wire (in FIG. 1A the complete wire, because all of it may have the same direction of laying progress, which in the shown example may be counter-clockwise, as indicated by arrows).

As shown in FIG. 1B, structures with mainly capacitive properties (indicated by the "c" of the wire reference $108c$) may be created by embedding wires $108c$, $108_1$, $108_2$ in parallel coil lines with alternating orientation 1 and 2. "Alternating orientation" may be understood to mean that, for the process of laying the parallel coil lines, a direction of laying progress is opposite for the parallel coil lines with the mainly inductive properties. Another way to describe this property may be a helicity, which may be opposite for the parallel coil lines with the mainly conductive properties. In the shown example, the "1"-direction of laying progress (the orientation) may be counter-clockwise, and the "2"-direction of laying progress (the orientation) may be clockwise, as indicated by arrows.

To create such coils with alternating orientation, typically the first orientation, i.e. the wire portion $108_1$ with the first orientation, is embedded first (see FIG. 2A), afterwards the alternating orientation (with the opposite helicity), i.e. the wire portion $108_2$ with the second orientation, is embedded in between the wire portions of the first orientation (see FIG. 2B, crosses in the wires of FIG. 2A and FIG. 2B are indicative of the first orientation, circles in the wires of FIG. 2B are indicative of the second orientation). The capacitance C may be influenced e.g. by a length l of the parallel wires $108c$, by a diameter 2R of the wires $108c$ and by a distance d of the wires: $C=\pi\varepsilon l/\text{arcosh}(d/2R)$ (see FIG. 3 for a graphic representation of the variables and of the arcosh function; $\varepsilon$ may be a permittivity of a medium between the wires).

The resistance of the booster (wire) antenna $108$ may be influenced e.g. by an overall length of the wire, by a diameter of the wire (smaller diameter=higher resistance) and by a specific resistance of the wire (e.g. pure Cu wire has a lower resistance than CuNi alloys).

SUMMARY

A chip card is provided. The chip card may include a chip card substrate and an antenna structure disposed in or over the chip card substrate, the antenna structure including a wire arranged to form a first antenna portion configured to contactlessly couple to a chip card external device and a second antenna portion configured to couple to a chip antenna, wherein the wire may include an electrically conductive material coated with an electrically insulating material, wherein the wire of the first antenna portion may be arranged such that a direction of laying progress of the wire of at least some adjacent wire portions are opposite to each other, such that the at least some adjacent wire portions may form a capacitor, wherein the isolation material of the at least some adjacent wire portions may be physically contacting each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A to 1C show schematic representations of three antenna arrangements;

FIG. 3 shows two schematic wires arranged at a distance forming a capacitor, and a graphic representation of a function describing a dependency of a capacitance of the wires on the distance between the wires;

FIG. 9 shows a process flow of a method of forming a chip card according to various embodiments.

DESCRIPTION

Figure 2A:
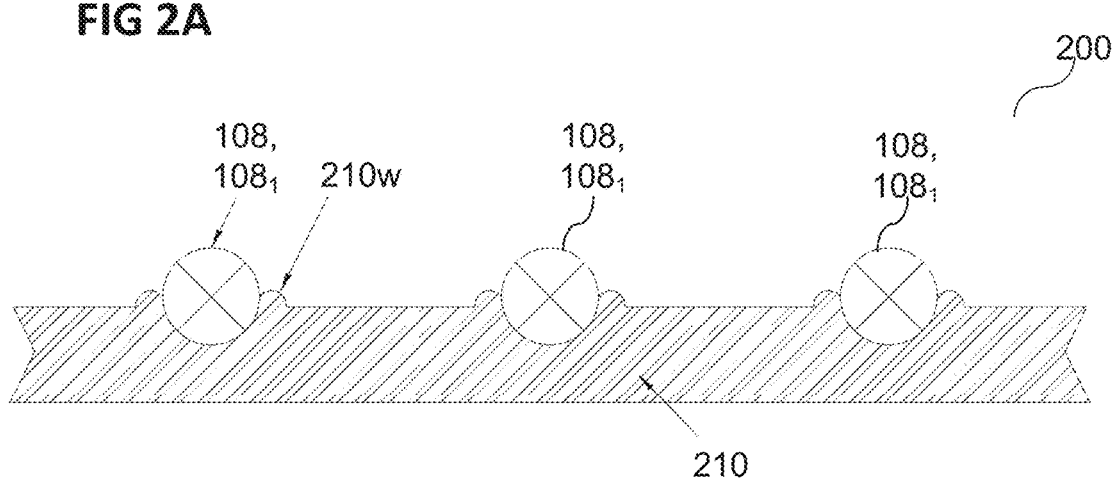
FIGS. 2A and 2B show schematic cross sections of two antenna arrangements.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

As shown in FIG. 1C, for setting both, an inductance and a capacitance, of the booster antenna 108 to defined values, the booster antenna 108 may include a wire portion 108$i$ with mainly inductive properties (referenced as 108$i_1$, for additionally indicating that the mainly inductive portion 108$i$ of the wire 108 is formed in this example by wire portions of the first orientation 1 (first winding direction, first direction of laying progress)), and a wire portion 108$c$ with mainly capacitive properties (referenced as 108$c_1$, 108$c_2$, for additionally indicating that the mainly capacitive portion 108$c$ of the wire is formed in this example by wire portions 108$_1$, 108$_2$ of the first orientation 1 (first winding direction, first direction of laying progress) and of the second orientation 2 (second winding direction, second direction of laying progress)), Showing the first winding direction 1 as counter-clockwise and the second winding direction 2 as clockwise is simply exemplary. It could also be the other way around.

A high capacitance may be required for tuning the booster antenna 108 to a specific resonance frequency, while observing other boundary conditions (e.g. Q-factor, common tuning of a module-antenna system) of a system that the booster antenna 108 is part of, e.g. the Smart Card.

As described above with reference to FIG. 3, in terms of wire pattern geometry, a capacitance may be influenced by a length l of the wire 108, 108$c$ and by a ratio of wire radius R to wire distance d. With a very small distance d of the wires (e.g. wire portions) 108, 108$c$, the capacitance of the system may increase strongly.

Even a very high capacitance value may be obtained with a short wire if a distance d between the wires (e.g. wire portions) 108$c$ is very small. To keep the wire length short, it may therefore be advantageous to place the wires (e.g. wire portions) with a very small distance d.

For obtaining large capacitance values, a distanced between the alternating wires 108$c$ may need to be as small as possible.

Figure 2B:
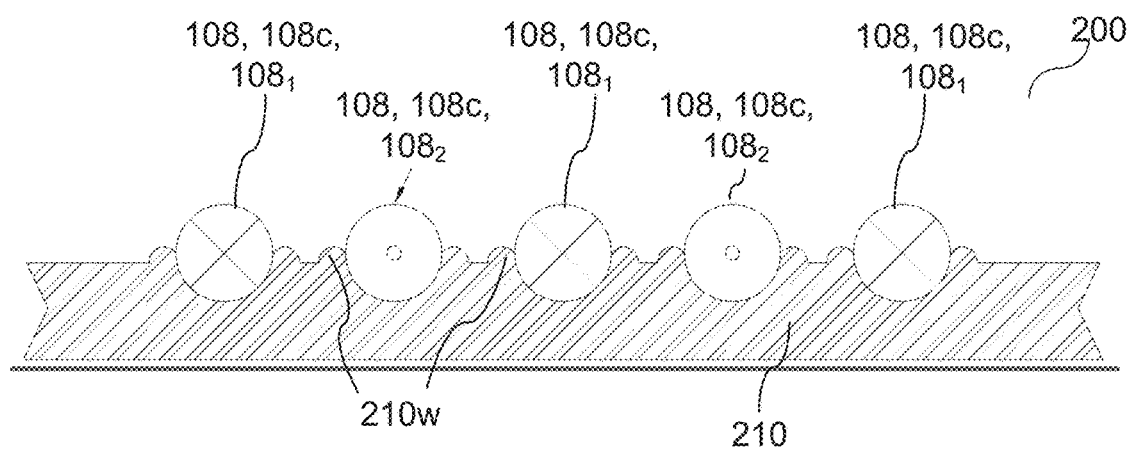

For alternating wire directions, an embedding, e.g. in a chip card substrate, with a small distance d may be difficult. Reasons for this may be machine and tool tolerances, and also a polymer bulge 210$w$ (see FIG. 2A and FIG. 2B) that may build up, e.g. on both sides of the wire 108, 108$_1$, when the wire is embedded, e.g. by ultrasonic (US) energy, in a chip card substrate 210.

For standard ultrasonic embedding, wires 108 with an electrically conductive material 440, also referred to as a core 440, and an insulating material 442, also referred to as insulating layer 442, insulation material 442 or insulation layer 442 (see FIG. 4), may be used. The insulating layer 442 may be required for avoiding short-circuit of wires, especially in areas where "wire jumps" 110 (see FIG. 1C) may be included for passing the wire 108 across already embedded structures. A material for the insulating layer 442 may for example be a polymer, e.g. a plastic material, e.g. polyurethane.

Figure 4:
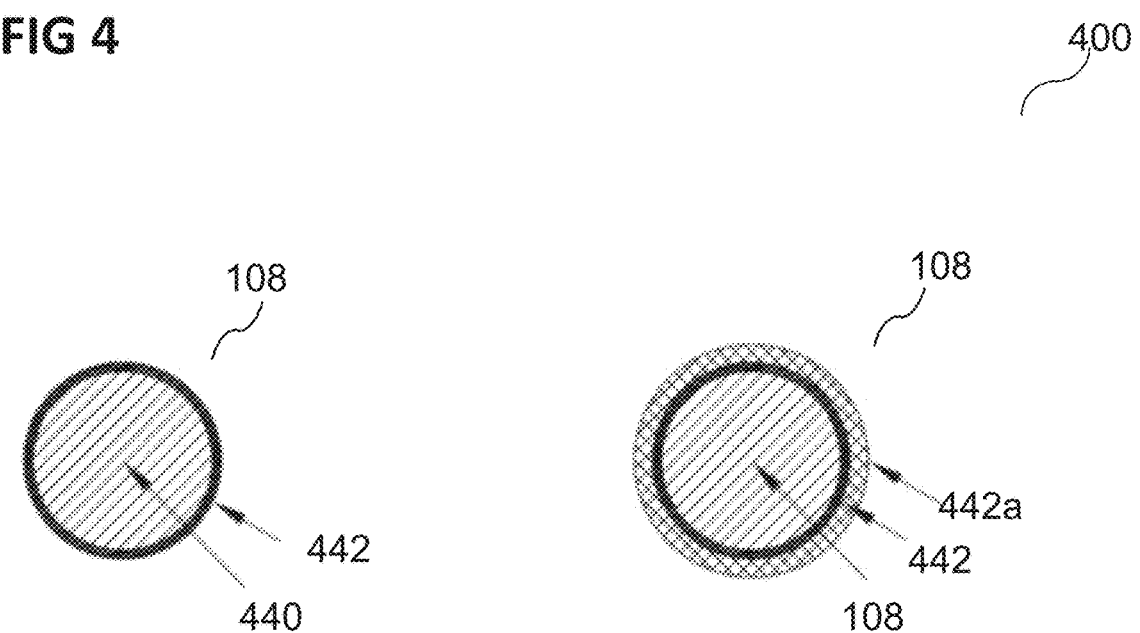
FIG. 4 shows schematic cross sections of two types of wires.

A special wire type may include, as part of the insulating layer 442, an additional coating 442$a$, e.g. a baked enamel coating (see FIG. 4). The baked enamel coating 442$a$ may serve as an adhesive that may for example be activated after an arranging of the wire 108. The activating may for example include supplying heat, ultrasound and/or ultraviolet light. Thereby, the wire 108 may be attached to a surface of the chip card substrate 210, and/or sections of the wire 108 may be attached to each other.

Using the special wire with the baked enamel coating 442$a$, the polymer bulging may be reduced, because the wire may adhere to the chip card substrate 210, e.g. a polymer sheet, rather by the adhesion provided by the baked enamel than by a form fit of wire embedding into the chip card substrate 210, e.g. the polymer sheet.

Figure 5:
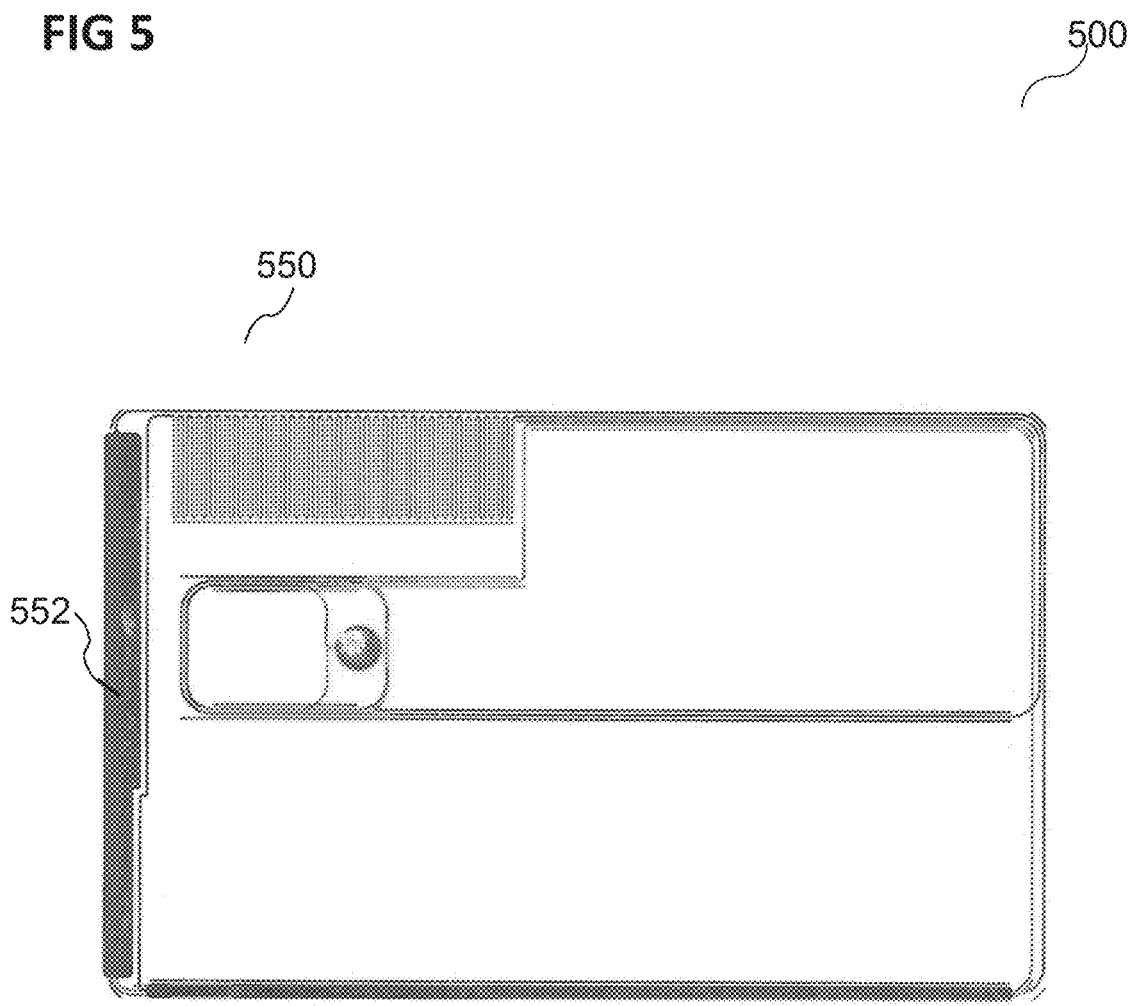
FIG. 5 shows a schematic representation of a chip card having a plate capacitor.

As an alternative solution for creating higher capacitance values in the antenna structure, a two-layer aluminum etched antenna may be used. In such a system 550 (see FIG. 5), the two layers may be used to build areas with capacitor plates 552.

However, a disadvantage of an aluminum etch antenna may be a higher price. In addition, the antenna may be placed on a PET base material, which may cause difficulties in terms of card manufacturing and card reliability. Hence, a market acceptance of such an antennas may be rather small.

Thus, a technical problem to be solved may be a manufacturing of a wire antenna, e.g. a booster antenna, with a high capacitance value, i.e. an antenna with a small distance of the wires in the capacitive structure (which requires alternating winding orientation of neighbouring wire lines).

Various embodiments representing different approaches may be provided for solving the problem.

In various embodiments, a method may be provided for arranging wires with alternating winding directions with a very small distance for enabling high capacitance values.

In various embodiments, a booster antenna may include a first antenna portion (e.g. configured as a big coil, i.e. a coil with a big diameter) that may be configured to contactlessly couple to the chip card reader, and a second antenna portion that may be configured to couple to the chip card antenna.

In various embodiments, a wire including an electrically conductive core and an electrically insulating coating may be provided for forming the antenna. The electrically conductive core may include or consist of an electrically conductive material, e.g. copper or a copper alloy, e.g. CuNi, $CuSn_6$. The electrically insulating coating may include or consist of an electrically insulating material, e.g. a polymer. The electrically insulating coating may also be referred to as insulation, isolation, insulation coating or wire insulation.

In various embodiments, alternating wire directions of the wire (of the antenna, e.g. of the first antenna portion) may be placed in a stacked arrangement.

In various embodiments, a plurality, e.g. two, first wire portions having a first direction of a laying progress and at least one second wire portion having an opposite second direction of the laying progress may be included in the stacked arrangement, such that the two first wire portions and the second wire portion may be arranged in a triangular configuration, e.g. as seen in cross section forming a triangle. This configuration may also be referred to as a triangularly stacked configuration or a triangular arrangement. Herein, the electrically insulating coating of the second wire portion may be physically contacting the electrically insulating coating of each of the (two) first wire portions.

In various embodiments, a plurality of first wire portions and a plurality of second wire portions may be provided. The plurality of first wire portions may be arranged in a first plane, and the plurality of second wire portions may be arranged in a second plane. The second plane may be arranged over the first plane. The second plane may be parallel or essentially parallel to the first plane. The plurality of first wire portions and the plurality of second wire portions may form a stacked arrangement. The plurality of second wire portions may be arranged such that the insulation material of each of the plurality of second wire portions is physically contacting the insulation material of two of the first wire portions.

In various embodiments, each pair of the plurality of first wire portions and/or each pair of the plurality of second wire portions may be arranged with a separation between them. In other words, each adjacent pair of the plurality of first wire portions and/or each adjacent pair of the plurality of second wire portions may be arranged without the respective insulating coatings physically contacting each other. The separation may in various embodiments be small, for example smaller than a diameter of the wire.

In various embodiments, the above described structure, e.g. the triangular arrangement or the two-layer-arrangement, may provide a very close distance of the alternating wires. Placement tolerance for the alternating wires may not be too critical, because the first wire portions, which may be disposed in the first layer, may provide some kind of a centering function for the second wire portions, which may be disposed in the second layer.

In various embodiments, the first wire portions and the second wire portions may be interleavingly arranged: the second wire portions may be arranged over the first wire portions in such a way that an outer surface of the second wire portions may be at least partially arranged below a top plane extending through a top of the outer surfaces of the first wire portions.

In various embodiments, an insulated wire with an additional coating, e.g. of baked enamel, may be used.

In various embodiments, a plurality of first wire portions and a plurality of second wire portions may be arranged together in a single plane, which may also be referred to as a common plane. For arranging the plurality of first wire portions and the plurality of second wire portions together in the common plane, the plurality of first wire portions and the plurality of second wire portions may first be arranged in a temporary configuration. After a re-formation process, the plurality of first wire portions and the plurality of second wire portions may assume a final configuration in the common plane.

The temporary configuration (also referred to as temporary arrangement, transitional arrangement or transitional configuration) may be the triangular configuration or the two-layer-arrangement. The re-formation process may include pressing the temporary configuration until the plurality of first wire portions and the (plurality of) second wire portion(s) are arranged in a single layer/plane. A pressing direction may be essentially orthogonal to the first plane of the triangular configuration or the two-layer-arrangement. For the pressing, pressure may be applied from one side onto the stationarily placed chip card substrate with the antenna arranged on it, e.g. from a side of the antenna, which may be referred to as a top side, or from a side of the chip card substrate, which may be referred to as a bottom side. Alternatively, pressure may be applied from both sides, i.e. the bottom and the top side.

In various embodiments, a hot tool may be used for the pressing. The wire of the first wire portions and the second wire portion(s) may include a coating, e.g. a baked enamel coating as described above. The coating, e.g. the baked enamel coating, may become soft and may allow to move the wires downwards and outwards to create the plane wire arrangement. For being arranged in the single common plane, the plurality of first wire portions and the (plurality of) second wire portion(s) may need to be longer than for the temporary configuration. A required additional wire length for this procedure may be gained from corner radii of the antenna.

In various embodiments, a cold tool may be used for the pressing and thus for the rearranging of the wires for creating the plane wire arrangement. Optionally, a heating process, e.g. a heating combined with pressing, may be applied after the rearranging of the wires, for example for softening the wire coating, e.g. the baked enamel coating.

In various embodiments, the re-formation process may be continued (for example in the same process as the re-formation for the rearranging of the wire with an additional temperature ramp, or in a separate process) to create a so-called "pre-pressed" antenna structure. In the pre-pressed antenna structure, the wire, i.e. the plurality of first wire portions and the (plurality of) second wire portion(s), may be embedded, e.g. embedded further than after the rearranging of the wire, in a chip card substrate on which the antenna may be arranged.

Using the rearranged single layer arrangement and the pre-pressed structure, a total height of an antenna sheet including the chip card substrate and the antenna, and optionally also of a chip card in which the antenna sheet may be included, may be reduced. The "re-formation" and "pre-pressed" structures may thus be advantageous if an overall thickness of the antenna sheet is critical.

In various embodiments, a plurality of first wire portions and at least one second wire portion may be arranged in a single plane with a separation between each adjacent pair of first wire portion and adjacent second wire portion. In a subsequent process, the wires may be coined.

In various embodiments, the coining process may be a cold process. In that case, an embedding of the wires into a chip card substrate on which the antenna may be arranged, which may for example be a polymer sheet, or—in a case in which a partial embedding is desired and/or may already have occurred—an embedding of the wires deeper into the chip card substrate may be avoided.

The coining may cause a deformation of the wires, so that the distance between the wires may decrease and a capacitance of the system may increase. The separation, i.e. the separation of the wires before the coining, may be chosen such that, after the coining process, insulation material of at least some adjacent wire portions, including at least one of the plurality of first wire portions and the at least one second wire portion, may be physically contacting each other. As a visual exemplary description of a result of the coining process, the wires may be deformed to have—as compared to the circular cross section—a flattened, e.g. elliptical or rectangular with rounded corners, cross section after the coining, wherein a long axis of the flattened cross section, e.g. the ellipse or the round-cornered rectangle, may extend within the plane in which the wire may be arranged, and essentially orthogonal to a length of the wire portions (i.e. the plurality of first wire portions and the at least one second wire portion). A wire with baked enamel may be used, e.g. preferably, for the coining. In this way, the wire may only be minimally embedded into the chip card substrate, e.g. the polymer sheet. This may be advantageous for the coining process.

Figure 6:
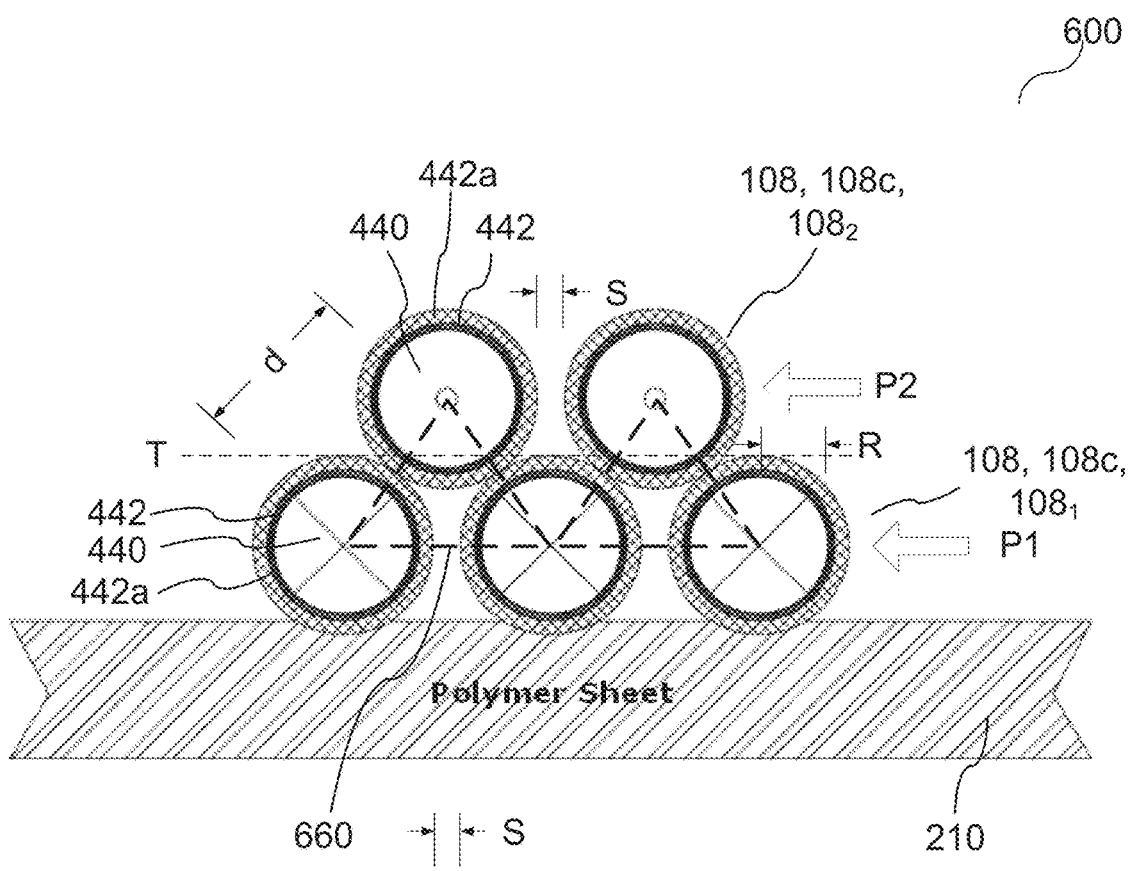
FIG. 6 shows a schematic cross section of an antenna arrangement according to various embodiments.

FIG. 6 shows a schematic cross section of an antenna arrangement 600 according to various embodiments.

Various parts, materials, concepts etc. may be identical or similar to those described above, and a description may thus be omitted.

In various embodiments, a booster antenna formed by a wire 108 may include a first antenna portion (e.g. configured as a big coil, i.e. a coil with a big diameter) that may be configured to contactlessly couple to a chip card reader (not shown). FIG. 6 shows a cross section of the first antenna portion. The booster antenna may further include a second antenna portion that may be configured to couple to a chip card antenna, which is not shown.

In various embodiments, e.g. as shown in FIG. 4, a wire 108 may be provided for forming the antenna. The wire 108 may include an electrically conductive material 440, also referred to as (electrically conductive) core 440 coated with an electrically insulating material 442, also referred to as insulating material, insulation material, electrically insulating coating, insulation, isolation, insulation coating, wire insulation, or simply as coating.

Even though the wire 108 may be depicted as a wire 108 with a circular (initial) cross section, the wire 108 may have any suitable (initial) cross section, e.g. elliptical, rectangular, quadratic, hexagonal, etc.

For differentiating different portions of the wire 108, indications and indices as described above may be used, i.e. 1 and 2 for a first and a second direction of laying progress (orientation, winding direction), respectively, c for a wire portion that is part of a mainly capacitive portion of the antenna, and i for a wire portion that is part of a mainly inductive portion of the antenna. Indications and indices may be used in combination (for example $108c_1$ for indicating a mainly capacitive wire portion with a first direction), or the indication and/or the index may be omitted if necessary or convenient, for example in a case where a totality of both winding directions of a mainly capacitive wire portion is referred to, or where it is clear that the capacitive portion of the wire is referred to, and only indices for the directions are used. The term "wires" may be used for simplicity and, unless specifically stated otherwise, may refer to "wire portions" of the same wire, rather than to different wires.

The electrically conductive core 440 may include or consist of an electrically conductive material, e.g. copper or a copper alloy, e.g. CuNi, $CuSn_6$. A diameter of the electrically conductive core 440 may be in a range from about 30 μm to about 120 μm, e.g. from about 50 μm to about 100 μm.

The electrically insulating material 442 may for example include or consist of a polymer, e.g. a plastic material, e.g. polyurethane, polyesterimide or polyamide-imide. The electrically insulating coating 442 may have a thickness in a range from about 10 μm to about 35 μm, e.g. from about 15 μm to about 30 μm.

In various embodiments, the electrically insulating material 442 may include an additional coating 442a, e.g. an adhesive coating as described above, e.g. a baked enamel coating 442a. In that case, the thickness of the insulating material 442 including the additional coating 442a may be in a range from about 20 μm to about 85 μm, e.g. from about 40 μm to about 60 μm.

In various embodiments, the insulating material 442 itself may also provide adhesive properties, such that the additional, e.g. adhesive, coating 442a may be obsolete.

In various embodiments, the first antenna portion may include a mainly capacitive portion 108c. In the mainly capacitive portion 108c, the wire 108 of the first antenna portion may be arranged such that directions 1, 2 of laying progress of the wire 108 of at least some adjacent wire portions $108c_1$, $108c_2$ are opposite to each other, such that the at least some adjacent wire portions $108c_1$, $108c_2$ form a capacitor. The insulating material 442 of the at least some adjacent wire portions $108c_1$, $108c_2$ may be physically contacting each other.

In various embodiments, alternating wire directions 1 and 2 of the wire 108 (of the antenna, e.g. of the first antenna portion) forming a capacitor may be placed in a stacked arrangement. As an example, such a stacked arrangement 600 is shown in FIG. 6.

In various embodiments, a plurality, e.g. two, first wire portions $108_1$ having a first direction of a laying progress and at least one second wire portion $108_2$ having an opposite second direction of the laying progress may be included in the stacked arrangement 600, such that the two first wire portions $108_1$ and the second wire portion $108_2$ may be arranged in a triangular configuration (e.g. forming a triangle 660 as seen in cross section). The at least one second wire portion $108_2$ may form a capacitor with each of the at least two first wire portions $108_1$. More generally, each second wire portion $108_2$ may form a capacitor with each first wire portion $108_1$ that it is in physical contact with.

The antenna arrangement may, in various embodiments, be arranged on a chip card substrate 210. The chip card substrate may include a polymer.

For the capacitive portion 108c of the antenna, it may be sufficient if it includes only three of the wire portions shown in FIG. 6, e.g. the leftmost three wire portions (shown as joined by the triangle 660 and including the two first wire portions $108_1$ at a bottom contacting the chip card substrate 210 and the second wire portion $108_2$ arranged on top of the two first wire portions $108_1$). This configuration may also be referred to as a triangularly stacked configuration/arrangement or triangular configuration/arrangement. Herein, the electrically insulating coating 442 (which may include the additional coating 442a) of the second wire portion $108_2$ may be physically contacting the electrically insulating coating 442 (which may include the additional coating 442a) of each of the (two) first wire portions $108_1$.

In various embodiments, a plurality of first wire portions $108_1$ and a plurality of second wire portions $108_2$ may be provided. The plurality of first wire portions $108_1$ may be arranged in a first plane P1, and the plurality of second wire portions $108_2$ may be arranged in a second plane P2. The second plane P2 may be arranged over the first plane P1. The second plane P2 may be parallel or essentially parallel to the first plane P1. The plurality of first wire portions $108_1$ and the plurality of second wire portions $108_2$ may form a stacked arrangement. The plurality of second wire portions $108_2$ may be arranged such that the insulating material 442 of each of the plurality of second wire portions $108_2$ may be physically contacting the insulating material 442 of two of the first wire portions $108_1$ (wherein the insulating material 442 may include the additional coating 442a). Each second wire portion $108_2$ may form a capacitor with each first wire portion $108_1$ that it is in physical contact with.

In various embodiments, each adjacent pair of the plurality of first wire portions $108_1$ and/or each adjacent pair of the plurality of second wire portions $108_2$ may be arranged with a separation S between them. In other words, each adjacent pair of the plurality of first wire portions $108_1$ and/or each adjacent pair of the plurality of second wire portions $108_2$ may be arranged without the respective insulating coatings 442 (which may include the additional coating 442a) physically contacting each other. The separation S may in various embodiments be small, for example smaller than a diameter 2R of the core 440 of the wire 108, which may also be referred to as a diameter of the wire 108.

In various embodiments, the above described structure, e.g. the triangular arrangement or the two-layer-arrangement, may provide a very close distance d of the alternating wire portions $108_1$, $108_2$; 108c. Placement tolerance for the alternating wire portions $108_1$, $108_2$; 108c may not be too critical, because the first wire portions $108_1$, which may be disposed in the first layer P1, may provide some kind of a centering function for the second wire portions $108_2$, which may be disposed in the second layer P2.

In various embodiments, the first wire portions $108_1$ and the second wire portions $108_2$ may be interleavingly arranged: The second wire portion(s) $108_2$ may be arranged over the first wire portions $108_1$ in such a way that an outer surface of the second wire portion(s) $108_2$ may be at least partially arranged below a top plane T extending along a top of the outer surfaces of the first wire portions $108_1$.

In various embodiments, a thickness of the additional coating 442a, which may for example include or consist of baked enamel, may be in a range from about 10 μm to about 50 μm, e.g. from about 20 μm to about 40 μm, e.g. around 30 μm.

In various embodiments, the additional coating 442a, e.g. the baked enamel, may act as an adhesive. The adhesive property of the additional coating 442a may for example be activated after an arranging of the wire 108. The activating may for example include supplying heat, ultrasound and/or ultraviolet light. Thereby, the wire 108 may be attached to a surface of the chip card substrate 210, and/or sections of the wire 108 may be attached to each other, for example the additional coating 442a of the plurality of first wire portions $108_1$ may be attached to the physically contacting additional coating 442a of the at least one second wire portion $108_2$.

The additional coating may, in various embodiments, include a polymer, for example at least one of polyamide and polyvinylbutyral.

In various embodiments, alternating wire directions 1 and 2 of the wire 108 (of the antenna, e.g. of the first antenna portion) forming a capacitor may be placed in a planar arrangement, i.e. in a single plane. As examples, such planar arrangements according to various embodiments are shown FIG. 7B, FIG. 7C and FIG. 8B.

Figure 7A:
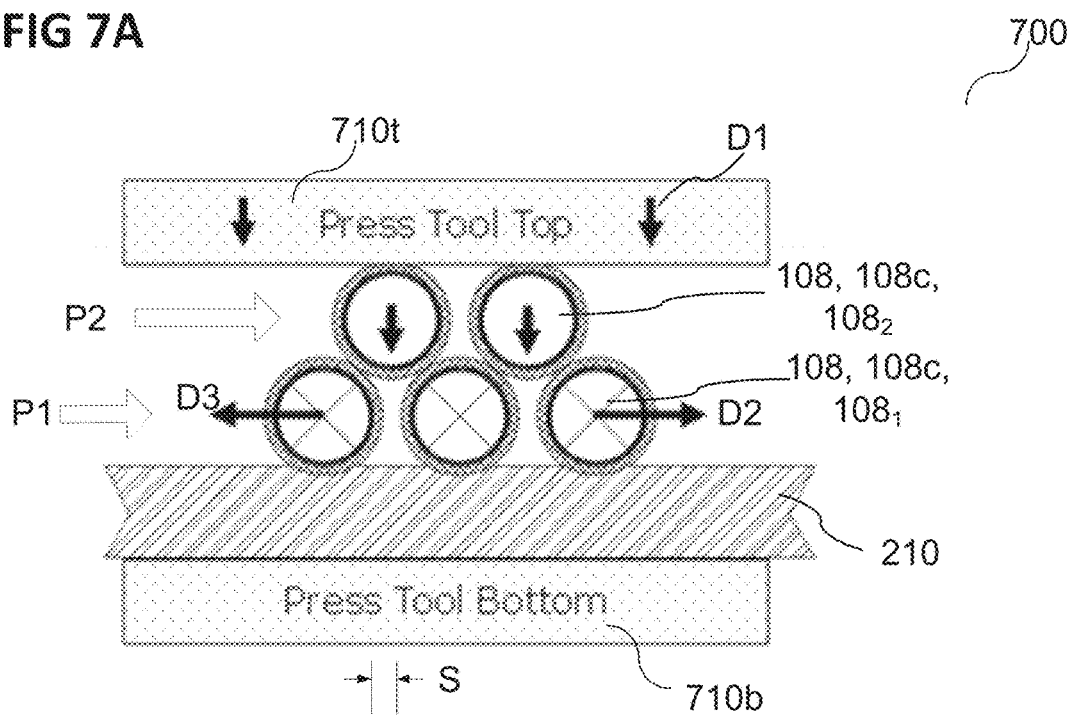
FIG. 7A to 7C show, as schematic cross sections, various stages of a process of forming an antenna arrangement according to various embodiments.
Figure 7B:
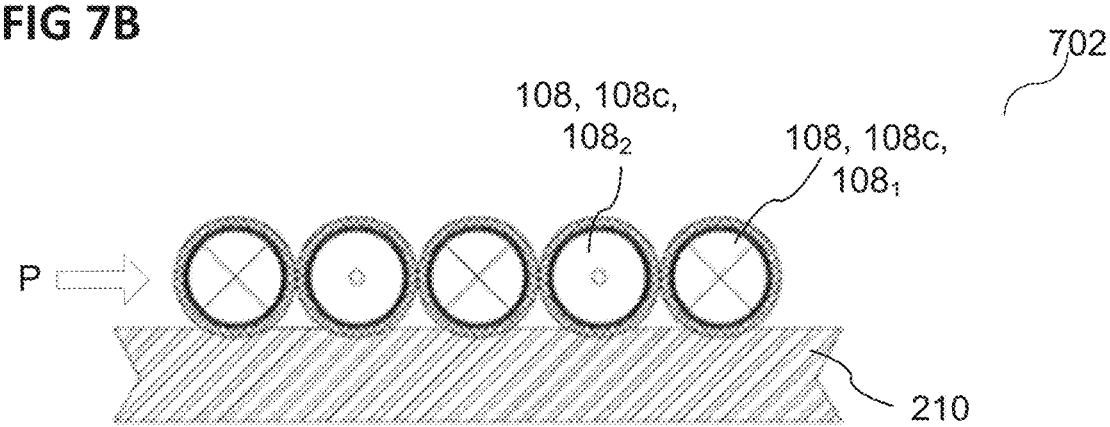
Figure 7C:
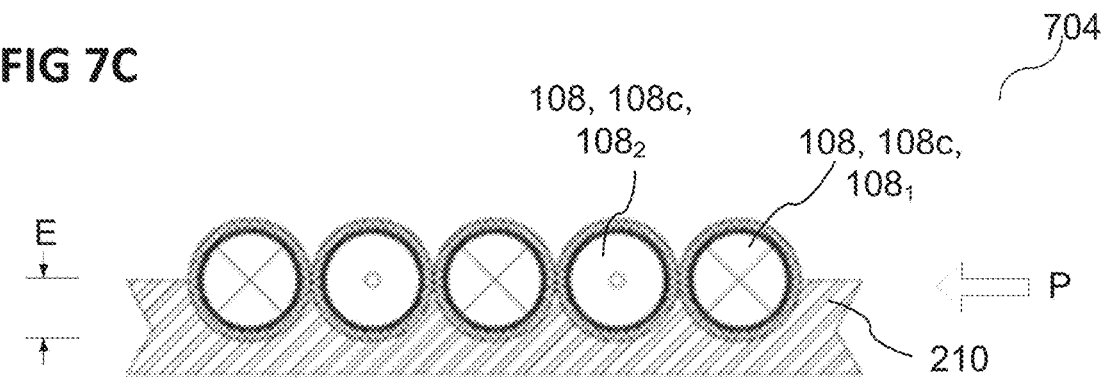

FIG. 7A to 7C show, as schematic cross sections, various stages 700, 702, and 704 of a process of forming an antenna arrangement according to various embodiments.

Various parts, materials, concepts etc. may be identical or similar to those described above, and a description may thus be omitted.

An antenna configuration shown as the stage 700 may represent a temporary, e.g. transitional, configuration for obtaining a final antenna configuration as shown in stage 702 or in stage 704. The temporary antenna configuration of FIG. 7A may correspond to the triangular arrangement or to the two-layer arrangement of FIG. 6.

In various embodiments, after arranging the antenna 108 according to the triangular arrangement or to the two-layer arrangement, both of which may have a plurality of first wire portions $108_1$ arranged in a first layer P1 and at least one second wire portion $108_2$ arranged in a second layer P2, the temporary arrangement may be re-configured to a final configuration, for example as shown in FIG. 7B or in FIG. 7C.

In various embodiments, in the final configuration, the plurality of first wire portions $108_1$ and the at least one second wire portion $108_2$, e.g. a plurality of second wire portions $108_2$, may be arranged together in a single plane P, which may also be referred to as a common plane P.

For arranging the plurality of first wire portions $108_1$ and the at least one second wire portion $108_2$, e.g. the plurality of second wire portions $108_2$, together in the common plane P, the plurality of first wire portions and the at least one second wire portion may be subjected to a re-formation process. After the re-formation process, which may include one or more sub-processes, the plurality of first wire portions and the at least one second wire portion, e.g. the plurality of second wire portions, may assume the final configuration in the common plane. In the final configuration, in the single plane P, the plurality of first wire portions and the at least one second wire portion, e.g. the plurality of second wire portions, may be alternatingly arranged. In other words, the at least one second wire portion may have, on each side within the plane P, one first wire portion of the plurality of first wire portions, and the insulating material 442 of the at least one second wire portion may be in physical contact with the insulating material 442 (e.g. the additional coating 442a) of the first wire portions located, within the plane P, on each side of the second wire portion.

The temporary configuration (also referred to as temporary arrangement, transitional arrangement or transitional configuration) may be the triangular configuration or the two-layer-arrangement. The re-formation process may include pressing the temporary configuration until the plurality of first wire portions and the (plurality of) second wire portion(s) are arranged in a single layer/plane. A pressing direction D1 may be essentially orthogonal to the first plane P1 of the triangular configuration or the two-layer-arrangement. For the pressing, pressure may be applied, e.g. using a top pressing tool 710t, from one side (e.g. from a top side) onto the stationarily placed chip card substrate 210, which may for example be arranged on a stationary bottom pressing tool 710b, with the antenna 108 arranged on it. Alternatively, the bottom pressing tool 710b may be moved, and the top pressing tool 710t may be stationary, or both, the top pressing tool 710t and the bottom pressing tool 710b, may be moved towards each other.

Irrespective of which of the pressing tools 710b, 710t may be moved for applying the pressure, the at least one second wire portion $108_2$, e.g. the plurality of second wire portions $108_2$, may be forced into a separation S (respective separations S) between adjacent first wire portions of the plurality of first wire portions $108_1$ above which the at least one second wire portion $108_2$ may be arranged. Thereby, the separation(s) may be enlarged to a size corresponding to a diameter corresponding at least approximately to a sum of a diameter 2R (see FIG. 6) of a core 440 of the wire 108 and twice a thickness of the insulating material 442, which may include the additional coating 442a. In various embodiments, e.g. in a case of a hot pressing tool 710t, 710b being used, the insulating material, e.g. the additional coating 442a, may be slightly deformed in the pressing process, such that its thickness between the cores 440 of the wire 108 may be slightly smaller or larger than an initial thickness.

In various embodiments, the coating 442 of the wire 108 of the first wire portions $108_1$ and the second wire portion(s) $108_2$ may include, e.g. as the additional coating 442a, a baked enamel coating as described above. The additional coating 442a, e.g. the baked enamel coating, may become soft and may allow or facilitate the moving of the second wire portion(s) $108_2$ downwards and the moving of the first wire portions $108_1$ outwards to create the plane wire arrangement. For being arranged in the single common plane, e.g. as shown in FIG. 7B or in FIG. 7C, the plurality of first wire portions and the (plurality of) second wire portion(s) may need to be longer than for the temporary configuration. A required additional wire length for this procedure may be gained from corner radii of the antenna.

In various embodiments, a cold tool 710t, 710b may be used for the pressing and thus for the rearranging of the wire portions for creating the plane wire arrangement. Optionally, a heating process, e.g. a heating combined with pressing, may be applied after the rearranging of the wire portions, for example for softening the insulating material 442, e.g. the additional coating 442a, e.g. the baked enamel coating.

In various embodiments, as shown in FIG. 7B, the pressing may be continued until the plurality of first wire portions $108_1$ and the at least one second wire portion $108_2$ are arranged in a single plane P, which may also be referred to as a common plane P. The wire 108 may be not or only slightly, e.g. by up to 20% of the core radius R, e.g. up to 10% of R, or e.g. up to a thickness of the insulating material, embedded in the chip card substrate 210.

In various embodiments, as shown in FIG. 7C, the re-formation process may be continued (for example in the same process as the re-formation for the rearranging of the wire portions with an additional temperature ramp, or in a separate process) to create a so-called "pre-pressed" antenna structure. In the pre-pressed antenna structure, the wire 108, i.e. the plurality of first wire portions and the (plurality of) second wire portion(s), may be embedded up to a depth E into the chip card substrate 210 on which the antenna may be arranged. The wire 108 may for example be embedded further, e.g. by more than 20% of the core radius R, e.g. up to or beyond a center of the common plane P of the wire 108, than after the rearranging of the wire (e.g. as shown in FIG. 7B).

Using the rearranged single layer arrangement (with the exemplary representation shown in FIG. 7B) and the pre-pressed structure (with the exemplary representation shown in FIG. 7C), a total height of an antenna sheet including the chip card substrate and the antenna, and optionally also of a chip card in which the antenna sheet may be included, may be reduced, e.g. as compared with the triangular arrangement or the two-layer-arrangement of FIG. 6. The "re-formation" and "pre-pressed" structures may thus be advantageous if an overall thickness of the antenna sheet is critical.

Figure 8A:
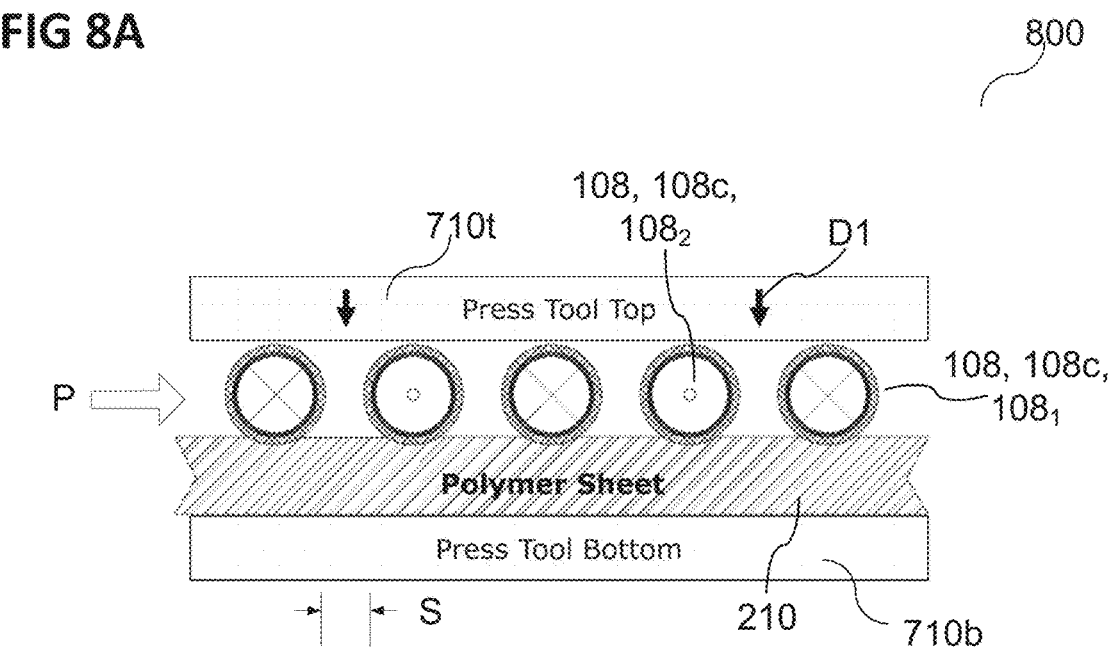
FIGS. 8A and 8B show, as schematic cross sections, various stages of a process of forming an antenna arrangement according to various embodiments.
Figure 8B:
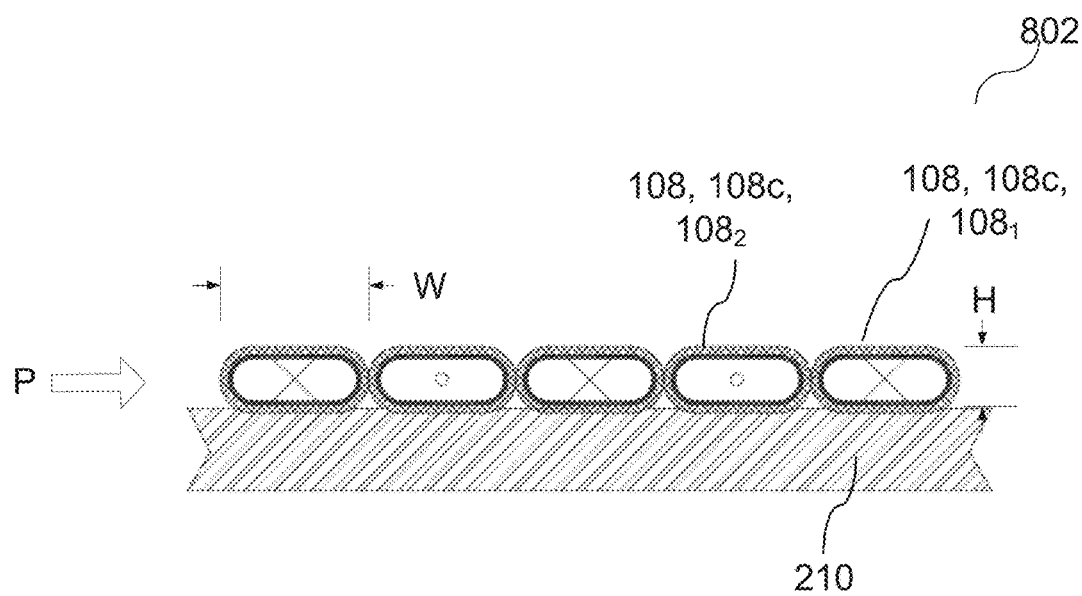

FIGS. 8A and 8B show, as schematic cross sections, two stages 800, 802 of a process of forming an antenna arrangement according to various embodiments.

Various parts, materials, concepts etc. may be identical or similar to those described above, and a description may thus be omitted.

In various embodiments, a plurality of first wire portions $108_1$ and at least one second wire portion $108_2$ may be arranged in a single plane P with a separation S between each adjacent pair of first wire portion $108_1$ and adjacent second wire portion $108_2$. In a subsequent process, the wire portions $108_1$, $108_2$ may be coined. The coining process may include pressing the wire portions and the chip card substrate 210 on which they may be arranged in a pressing tool 710t, 710b, which may include a top pressing tool 710t and a bottom pressing tool 710b. The pressing tool 710t, 710b may be similar or identical to the pressing tool 710t, 710b described above. Pressure in a direction D1, essentially orthogonal to the single plane P, may be applied by the pressing tool.

In various embodiments, the coining process may be a cold process. In that case, an embedding of the wire portions into a chip card substrate 210 on which the antenna may be arranged, which may for example be a polymer sheet, or—in a case in which a partial embedding is desired and/or may already have occurred—an embedding of the wires deeper into the chip card substrate 210, may be avoided.

The coining may cause a deformation of the wire portions, e.g. a flattening in the direction D1 in which the pressure may be applied, and a corresponding broadening in an essentially orthogonal direction within the plane P in which the wire portions are arranged and essentially orthogonal to lengths of the wire portions, so that a separation S between the wire portions may decrease (e.g. to zero, since the coining process may be continued until insulating material 442 of at least one of the plurality of first wire portions $108_1$ and insulating material 442 of the at least one second wire portion $108_2$, which together may be forming a capacitor, are physically contacting each other). Thereby, a capacitance of the capacitor may increase.

The separation S of the wire portions before the coining may be chosen such that, after the coining process, the insulation material 442 of at least some adjacent wire portions, including at least one of the plurality of first wire portions $108_1$ and the at least one second wire portion $108_2$, may be physically contacting each other. As a visual exemplary description of a result of the coining process, the wire portions may be deformed to have—as compared to a for example circular original cross section—a flattened, e.g. elliptical or rectangular-with-rounded-corners, cross section after the coining, wherein a long axis of the flattened cross section, e.g. the ellipse or the round-cornered rectangle, may extend within the plane P in which the wire 108 may be arranged, and essentially orthogonal to a length of the wire portions (i.e. the plurality of first wire portions 108₁ and the at least one second wire portion 108₂). A wire with the additional coating 442a, e.g. with baked enamel, may be used, e.g. preferably, for the coining. In this way, the wire 108 may only be minimally embedded into the chip card substrate 210, e.g. the polymer sheet. This may be advantageous for the coining process.

FIG. 9 shows a process flow 900 of a method of forming a chip card according to various embodiments.

In various embodiments, the method of forming a chip card may include providing a chip card substrate (in 910), and disposing an antenna structure in or over the chip card substrate, the antenna structure including a wire arranged to form a first antenna portion configured to contactlessly couple to a chip card external device and a second antenna portion configured to couple to a chip antenna, wherein the wire may include an electrically conductive material coated with an electrically insulating material, wherein the wire of the first antenna portion may be arranged such that directions of laying progress of the wire of at least some adjacent wire portions may be opposite to each other, such that the at least some adjacent wire portions may form a capacitor, wherein the insulating material of the at least some adjacent wire portions may be physically contacting each other (in 920).

In various embodiments, a chip card is provided. The chip card may include a chip card substrate, and an antenna structure disposed in or over the chip card substrate, the antenna structure including a wire arranged to form a first antenna portion configured to contactlessly couple to a chip card external device and a second antenna portion configured to couple to a chip antenna, wherein the wire may include an electrically conductive material coated with an electrically insulating material, wherein the wire of the first antenna portion may be arranged such that directions of laying progress of the wire of at least some adjacent wire portions may be opposite to each other, such that the at least some adjacent wire portions may form a capacitor, wherein the insulation material of the at least some adjacent wire portions may be physically contacting each other.

In various embodiments, the chip card may further include a chip having at least one electronic component.

In various embodiments, the at least some adjacent wire portions may include a plurality of first wire portions having a first direction of the laying progress and at least one second wire portion having the opposite second direction of the laying progress, and wherein two first wire portions of the plurality of first wire portions and one second wire portion of the at least one second wire portion may be arranged in a triangular configuration.

In various embodiments, the at least one second wire portion may include a plurality of second wire portions, wherein the plurality of first wire portions may be arranged in a first plane, and wherein the plurality of second wire portions may be arranged in a second plane parallel to the first plane.

In various embodiments, the at least some adjacent wire portions may include a first wire portion having a first direction of the laying progress and a second wire portion having the opposite second direction of the laying progress, and wherein the first wire portion and the second wire portion may be arranged in a single plane.

In various embodiments, a width of a cross section of the wire in the plane is larger than a height of the cross section of the wire orthogonal to the plane.

In various embodiments, the electrically conductive material may include copper or a copper alloy.

In various embodiments, the insulation material may include a polymer material.

In various embodiments, the wire may include an adhesive coating.

In various embodiments, a method of forming a chip card may be provided. The method may include disposing an antenna structure in or over a chip card substrate, the antenna structure including a wire arranged to form a first antenna portion configured to contactlessly couple to a chip card external device and a second antenna portion configured to couple to a chip antenna, wherein the wire may include an electrically conductive material coated with an electrically insulating material, wherein the wire of the first antenna portion may be arranged such that directions of laying progress of the wire of at least some adjacent wire portions may be opposite to each other, such that the at least some adjacent wire portions form a capacitor, wherein the insulating material of the at least some adjacent wire portions may be physically contacting each other.

In various embodiments, the at least some adjacent wire portions may include a plurality of first wire portions having a first direction of the laying progress and at least one second wire portion having the opposite second direction of the laying progress.

In various embodiments, the disposing an antenna structure may include disposing two first wire portions of the plurality of first wire portions in or over the chip card substrate, and arranging one second wire portion of the at least one second wire portion over and between the two first wire portions, such that the two first wire portions and the second wire portion may be arranged in a triangular configuration.

In various embodiments, the method may further include pressing the second wire portion towards the chip card substrate until the second wire portion is arranged between the two first wire portions.

In various embodiments, the method may further include pressing the antenna structure towards the chip card substrate until the antenna structure is at least partially embedded in the chip card substrate.

In various embodiments, the disposing an antenna structure may include disposing the at least some adjacent wire portions without their insulation material physically contacting each other, and pressing the antenna structure towards the chip card substrate, thereby flattening the wire, until the insulation material of the at least some adjacent wire portions may be physically contacting each other.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

What is claimed is:

1. A chip card, comprising:
a chip card substrate; and
an antenna structure comprising an insulated wire arranged in or over the chip card substrate to form a first antenna portion configured to contactlessly couple to a chip card external device and a second antenna portion configured to couple to a chip antenna;
wherein the insulated wire comprises an insulated material coated around an electrically conductive material core;
wherein the first antenna portion comprises a first antenna subportion arranged in a first direction and a second antenna subportion arranged in a second direction opposite to the first direction; wherein the first antenna subportion is laterally adjacent and horizontally parallel to the second antenna subportion, such that the at least some laterally adjacent insulated wire portions form a capacitor; and
wherein the electrically insulating material of the at least some adjacent insulated wire portions is physically contacting each other.

2. The chip card according to claim 1, further comprising a chip comprising at least one electronic component.

3. The chip card according to claim 1, wherein the at least some laterally adjacent insulated wire portions comprise a plurality of first insulated wire portions having a first direction of the laying progress and at least one second insulated wire portion having an opposite second direction of the laying progress, and wherein two first insulated wire portions of the plurality of first insulated wire portions and one second insulated wire portion of the at least one second insulated wire portion are arranged in a triangular configuration.

4. The chip card according to claim 3, wherein the at least one second insulated wire portion comprises a plurality of second insulated wire portions, wherein the plurality of first insulated wire portions is arranged in a first plane, and wherein the plurality of second insulated wire portions is arranged in a second plane parallel to the first plane.

5. The chip card according to claim 1, wherein the at least some laterally adjacent insulated wire portions comprise a first insulated wire portion having a first direction of the laying progress and a second insulated wire portion having an opposite second direction of the laying progress, and wherein the first insulated wire portion and the second insulated wire portion are arranged in a single plane.

6. The chip card according to claim 5, wherein a width of a cross section of the insulated wire in the single plane is larger than a height of the cross section of the insulated wire orthogonal to the single plane.

7. The chip card according to claim 1, wherein the electrically conductive material comprises copper or a copper alloy.

8. The chip card according to claim 1, wherein the electrically insulating material comprises a polymer material.

9. The chip card according to claim 1, wherein the insulated wire comprises an adhesive coating around the electrically insulating material of the insulated wire: wherein the adhesive coating adhesively connects the first antenna subportion of insulated wire to the laterally adjacent and horizontally parallel second antenna subportion.

* * * * *